United States Patent [19]

Grove et al.

[11] Patent Number: 5,422,439
[45] Date of Patent: Jun. 6, 1995

[54] CONVERTIBLE CABLE ASSEMBLY

[75] Inventors: Bruce K. Grove; Harry A. Loder, both of Austin, Tex.

[73] Assignee: Massachusetts Manufacturing and Mining Company, St. Paul, Minn.

[21] Appl. No.: 99,712

[22] Filed: Jul. 29, 1993

[51] Int. Cl.⁶ .............................................. H01B 7/08
[52] U.S. Cl. ...................... 174/117 F; 156/55; 156/289; 174/117 R; 174/117 FF
[58] Field of Search ......... 174/117 F, 117 FF, 117 R, 174/117 A; 156/55, 289

[56] References Cited

U.S. PATENT DOCUMENTS

| | | | |
|---|---|---|---|
| 3,733,428 | 5/1973 | Fry | 174/72 A |
| 3,819,848 | 6/1974 | Fry | 174/72 A |
| 3,898,371 | 8/1975 | Bridgett | 174/72 A |
| 3,911,201 | 10/1975 | Fry | 174/72 A |
| 4,154,977 | 5/1979 | Verma | 174/117 F |
| 4,165,559 | 8/1979 | Lang et al. | 29/629 |
| 4,486,619 | 12/1984 | Trine et al. | 174/34 |
| 4,625,074 | 11/1986 | Cox | 174/117 F |
| 4,767,891 | 8/1988 | Biegon et al. | 174/34 |
| 5,206,462 | 4/1993 | Lura et al. | 174/117 A |
| 5,268,531 | 12/1993 | Nguyen et al. | 174/36 |
| 5,276,759 | 1/1994 | Nguyen et al. | 174/117 F |

FOREIGN PATENT DOCUMENTS

| | | | |
|---|---|---|---|
| 39190 | 3/1977 | Japan | 174/117 F |
| 1417209 | 12/1975 | United Kingdom | 174/117 F |

*Primary Examiner*—Morris H. Nimmo
*Attorney, Agent, or Firm*—Gary L. Griswold; Walter N. Kirn; David W. Anderson

[57] ABSTRACT

A cable assembly includes a number of insulated wires removably attached to a tearable backing. This construction allows the simultaneous termination of the wires since they are held in position for mass termination equipment and permits the free flow of air around and between the wires, in addition to ease of routing the wires, once the backing has been removed after termination of the wires.

3 Claims, 1 Drawing Sheet

CONVERTIBLE CABLE ASSEMBLY

FIELD OF THE INVENTION

The present invention relates to cables used to conduct electricity for power or signaling purposes between connectors which may be attached to electrical or electronic devices.

BACKGROUND OF THE INVENTION

Metal electrical conductors are commonly used to conduct electricity from one electrical or electronic device to another. These conductors usually are produced in the form of individual wires including a single length of solid or stranded conductor surrounded by an insulating material or a flat cable having a number of parallel conductors surrounded by a sheath of insulating material.

When a large number of connections are to be made between two devices, it is most convenient to utilize the flat cable configuration of conductors because the maintenance of the conductors in a regularly spaced relationship to each other allows all the conductors to be simultaneously attached to a device or connector by well-known mass termination equipment. However, when the conductors are used in an crowded environment where cooling, flexibility of the cable and convenient routing of the cable are important considerations, such as inside a computer chassis, the use of individual wires would be preferable since the free flow of air is not impeded by individual wires as it would be by a wide cable and individual wires are much more flexible and easier to route than flat cable.

It would thus be desirable to combine the best features of both configurations by a construction which held individual wires in a desired configuration temporarily to permit mass termination but which would thereafter allow the separation of the wires to permit the free flow of air between the conductors and enhance the ability to route the wires within the available space.

SUMMARY OF THE INVENTION

The present invention accomplishes the desirable results described above by providing a cable assembly including a series of individual insulated electrical wires each including a central core of electrically conductive material surrounded by an electrically insulative material, a backing of a thin sheet of tearable material and means removably attaching the wires to the backing material with the wires extending parallel to and regularly spaced from each other. This arrangement is provided so that the wires are located with respect to each other so as to permit simultaneous termination of the wires and also so the backing may be removed from the wires after such termination to produce discrete wires extending from the termination thus permitting the free flow of air around and between the wires and greatly improve the flexibility of and ability to route the cable assembly.

BRIEF DESCRIPTION OF THE DRAWINGS

The present invention will be more thoroughly described with respect to the accompanying drawings, wherein like numbers refer to like parts in the several views, and wherein.

DESCRIPTION OF THE PREFERRED EMBODIMENT

Figure 1:
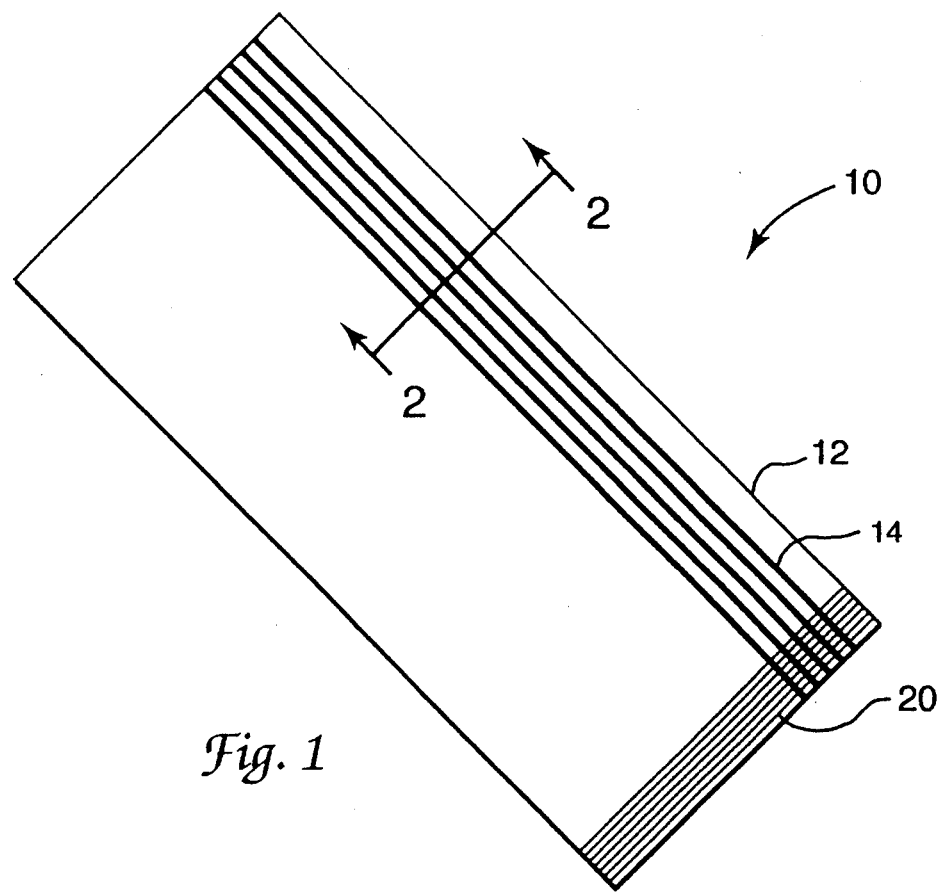
FIG. 1 is a plan view of a cable assembly according to the present invention.
Figure 2:
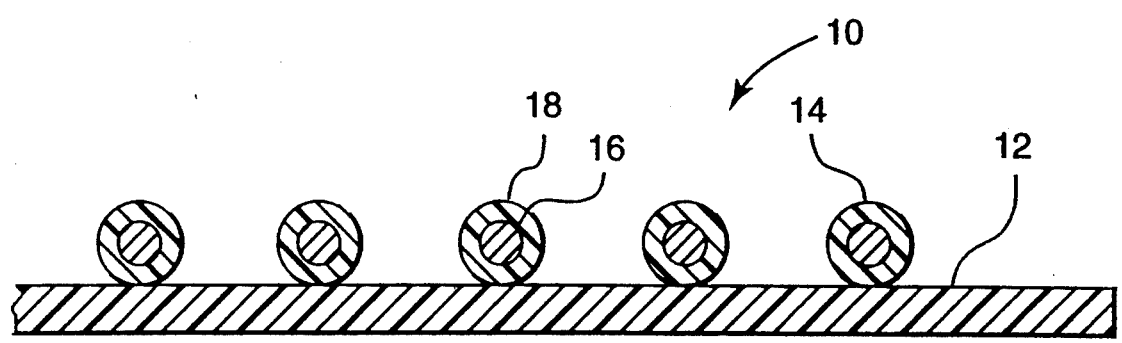
FIG. 2 is an end view of a portion of the invention of FIG. 1.

FIG. 1 illustrates one embodiment of a cable assembly, generally indicated as 10, which includes a backing sheet 12 and a series of parallel, spaced wires 14 (not all wires 14 are shown). As best seen in FIG. 2, the wires include a central conductor 16, typically copper ar a copper alloy, surrounded by electrically insulative material 18.

The purpose of the invention is to provide a cable assembly which combines the best features of individual wires and conventional flat cable, both of which are used widely in the electronics industry. In environments where cooling is necessary, such as inside the chassis of a computer, the use of individual wires to connect component is desirable because air can flow around and between the wires and so reach the components which need to be cooled and individual wires are much more flexible than a unitary cable and so easier to route within the limited space available. The detrimental aspects of using individual wires is that the time and effort necessary to individually terminate each wire is prohibitive in most cases. The advantage, therefore, of using flat cable, wherein a series of conductors are maintained in parallel, spaced relationship by a sheath of insulating material, is that a large number of conductors can be simultaneously terminated by well known equipment. As implied above, however, the use of flat cable is detrimental in some situations because it presents a long, wide flat surface which is impervious to the flow of air and is stiff and therefore difficult to route within a confined space.

The present invention provides a cable assembly 10 which is initially configured similarly to a flat cable so that the advantages of simultaneous termination of the conductors is possible, and which is convertible after termination to a configuration which consists of individual wires rather than flat cable.

This is accomplished by removably mounting a number of insulation-covered individual wires 14 on a backing sheet 12. The wires 14 are located and maintained in a desired relationship to each other to allow simultaneous termination of the conductors 16 of the wires 14 to a connector or directly to a device, and the backing may be removed after termination to reduce the cable 10 to a number of individual wires 14.

The backing 12 must be sufficiently strong to survive the rigors of shipping and handling, but must be tearable so that it can be removed from the wires 14 at some time after termination of the conductors 16 is accomplished. Sufficiently thick paper or sufficiently thin polymeric material will meet theses criteria, as would other materials such a metal foil. The preferred material is poly (ethylene terephthalate).

The wires 14 commonly have an insulative layer 18 of polyvinyl chloride and thus may be attached to the backing 12 by heat bonding, preferably in conjunction with the application of pressure, or sonic welding. Alternatively, the wires 14 and the backing sheet 12 could be coextruded so that the wires 14 and the backing 12 are bonded to each other as each are produced. It is merely required that the method of attachment of the wires 14 to the backing 12 provide a bond which is sufficiently strong to maintain attachment until termination of the conductors 16 is accomplished and which allows separation of the backing 12 and the wires 14 thereafter. The preferred method of attaching the wires 14 to the backing 12 is by means of an adhesive. Any adhesive which is compatible with the materials used for the backing 12 and the wires 14 and which does not adhere so aggressively that the backing 12 cannot be removed from the wires 14 can be used, although hot melt adhesives are preferred.

To allow easy removal of just the length of backing 12 desired, it may be desirable to perforate 20 the backing 12 at intervals along its length, as illustrated in FIG. 1, although not all perforations 20 along the length of the cable 10 are shown. The perforations 20 may be spaced at any interval between perforations 20 which is deemed desirable.

Although the invention has been disclosed with respect to only a single embodiment, many modifications will be apparent to those skilled in the art. For example, although single conductor wires have been illustrated, other types of electrically conductive wires may be utilized, such as coaxial conductors.

We claim:

1. A cable assembly comprising:
   a series of individually insulated electrical wires, each including a central core of electrically conductive material surrounded by an electrically insulative material;
   a backing of a thin sheet of tearable material; and
   means removably attaching said wires to said backing material with said wires extending parallel to and regularly spaced from each other;
   so that said wires are located with respect to each other so as to permit simultaneous termination of said wires and so that said backing may be removed from said wires after such termination to produce discrete wires extending from said termination thus permitting the free flow of air around and between said wires; and
   wherein said backing is weakened in a direction transverse to the extension of said wires to facilitate tearing and removal of said backing.

2. A cable assembly comprising:
   a series of individually insulated electrical wires, each including a central core of electrically conductive material surrounded by an electrically insulative material;
   a backing of a thin sheet of tearable material; and
   means removably attaching said wires to said backing material with said wires extending parallel to and regularly spaced from each other;
   so that said wires are located with respect to each other so as to permit simultaneous termination of said wires and so that said backing may be removed from said wires after such termination to produce discrete wires extending from said termination thus permitting the free flow of air around and between said wires; and
   wherein said backing is weakened by perforations in a direction transverse to the extension of said wires to facilitate tearing and removal of said backing.

3. A cable assembly comprising:
   a series of individually insulated electrical wires, each including a central core of electrically conductive material surrounded by an electrically insulative material;
   a backing of a thin sheet of tearable material; and
   means removably attaching said wires to said backing material with said wires extending parallel to and regularly spaced from each other;
   so that said wires are located with respect to each other so as to permit simultaneous termination of said wires and so that said backing may be removed from said wires after such termination to produce discrete wires extending from said termination thus permitting the free flow of air around and between said wires; and
   wherein said backing is weakened by perforations in a direction transverse to the extension of said wires to facilitate tearing and removal of said backing, and wherein said backing perforations are regularly spaced along the length of said backing.

* * * * *

UNITED STATES PATENT AND TRADEMARK OFFICE
CERTIFICATE OF CORRECTION

PATENT NO. : 5,422,439
DATED : June 6, 1995
INVENTOR(S) : Bruce K. Grove and Harry A. Loder It is certified that error appears in the above-indentified patent and that said Letters Patent is hereby corrected as shown below:

On the title page: Item [73]
Assignee: "Massachusetts Manufacturing and Mining Company" should read --Minnesota Mining and Manufacturing Company--.

Signed and Sealed this

Seventeenth Day of June, 1997

*Attest:*

BRUCE LEHMAN

*Attesting Officer*     *Commissioner of Patents and Trademarks*